United States Patent

Paulson et al.

[15] 3,701,391
[45] Oct. 31, 1972

[54] BUOYANCY TYPE WEIGHING SCALE

[72] Inventors: Erland G. Paulson, Huntington Beach; Charles G. Mandala, Palos Verdes Peninsula, both of Calif.

[73] Assignee: Eldon Industries, Inc., Hawthorne, Calif.

[22] Filed: Oct. 21, 1971

[21] Appl. No.: 191,525

[52] U.S. Cl. .................................................. 177/207
[51] Int. Cl. ............................................. G01g 5/02
[58] Field of Search ............... 177/207, 208, 209, 254

[56] References Cited

UNITED STATES PATENTS

| 2,647,740 | 8/1953 | Jackson | 177/207 |
| 2,936,164 | 5/1960 | Giorgio | 177/207 |
| 3,633,696 | 1/1972 | Kleysteuber | 177/208 |

*Primary Examiner*—Richard B. Wilkinson
*Assistant Examiner*—George H. Miller, Jr.
*Attorney*—Edward D. O'Brian

[57] ABSTRACT

A weighing device for weighing items through the use of Archimedes' principal can be constructed utilizing a float suspended or supported by a liquid within a housing. To prevent the loss of liquid the interior of the housing above the liquid is sealed off by a flexible diaphragm extending between the float and the housing. To insure accurate weighing, means are provided for controlling the pressure in the housing above the liquid and for adjusting a means for determining the depth of the float within the housing so that the level of the liquid will be a true indication of the weight of an item being weighed.

12 Claims, 6 Drawing Figures

PATENTED OCT 31 1972 3,701,391
SHEET 1 OF 2
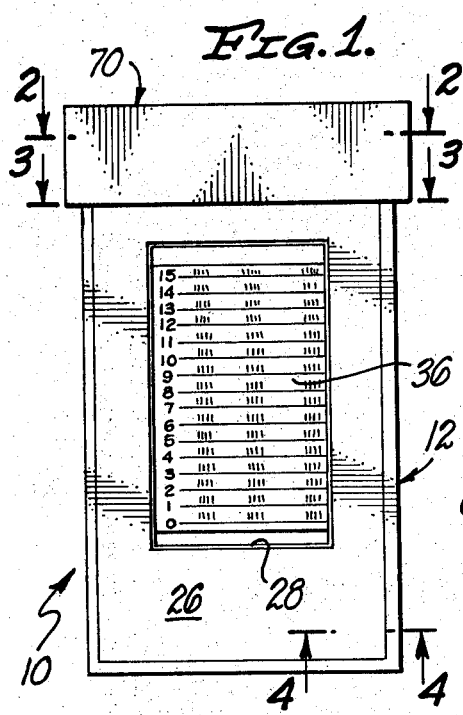
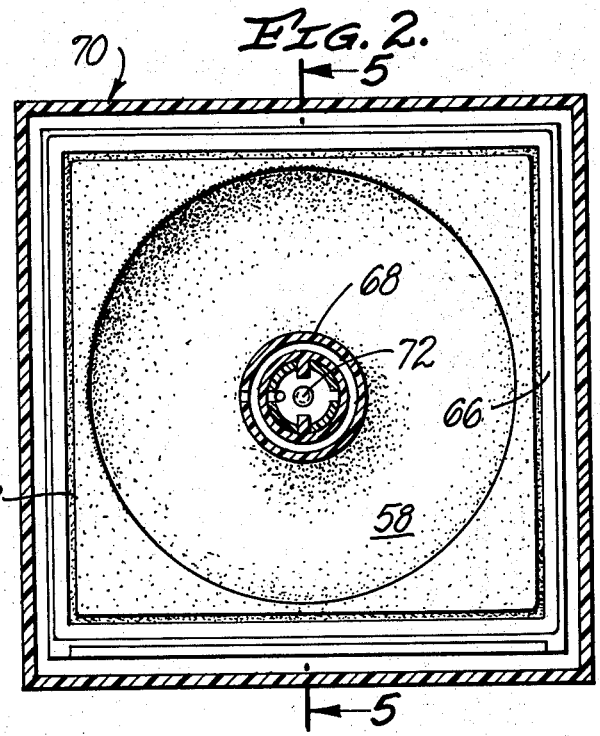
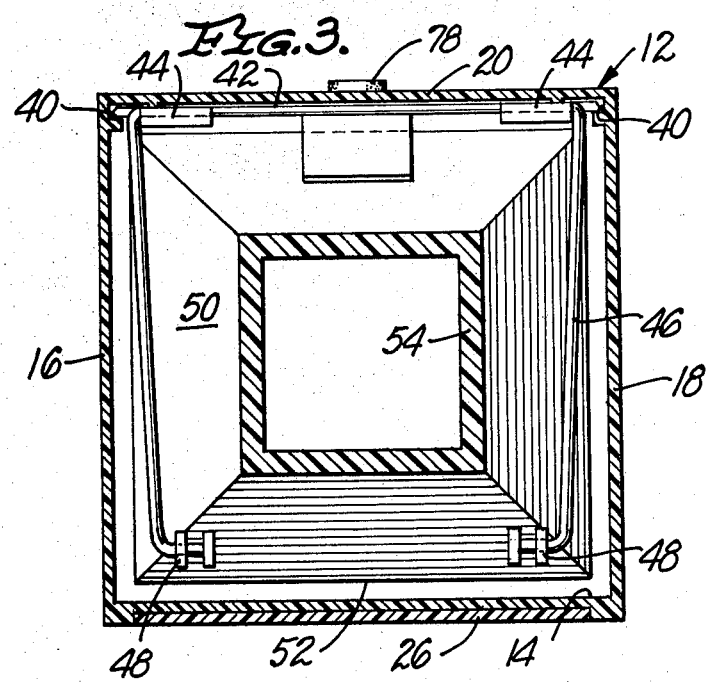
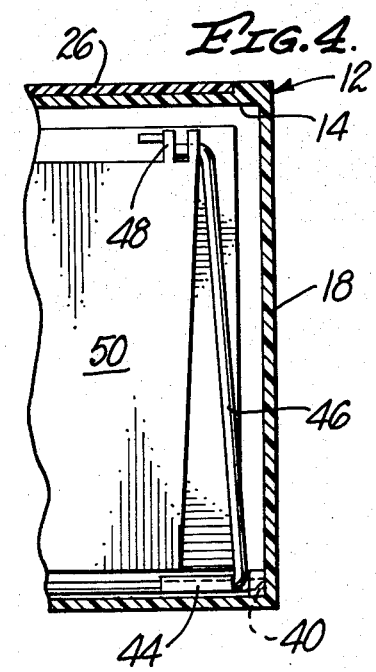
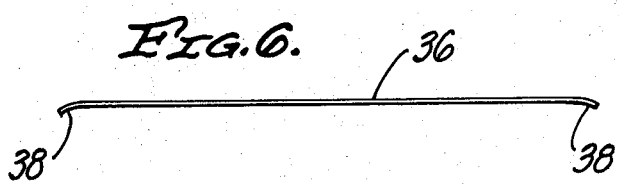
INVENTORS
ERLAND G. PAULSON,
CHARLES G. MANDALA
BY
EDWARD D. O'BRIAN
ATTORNEY

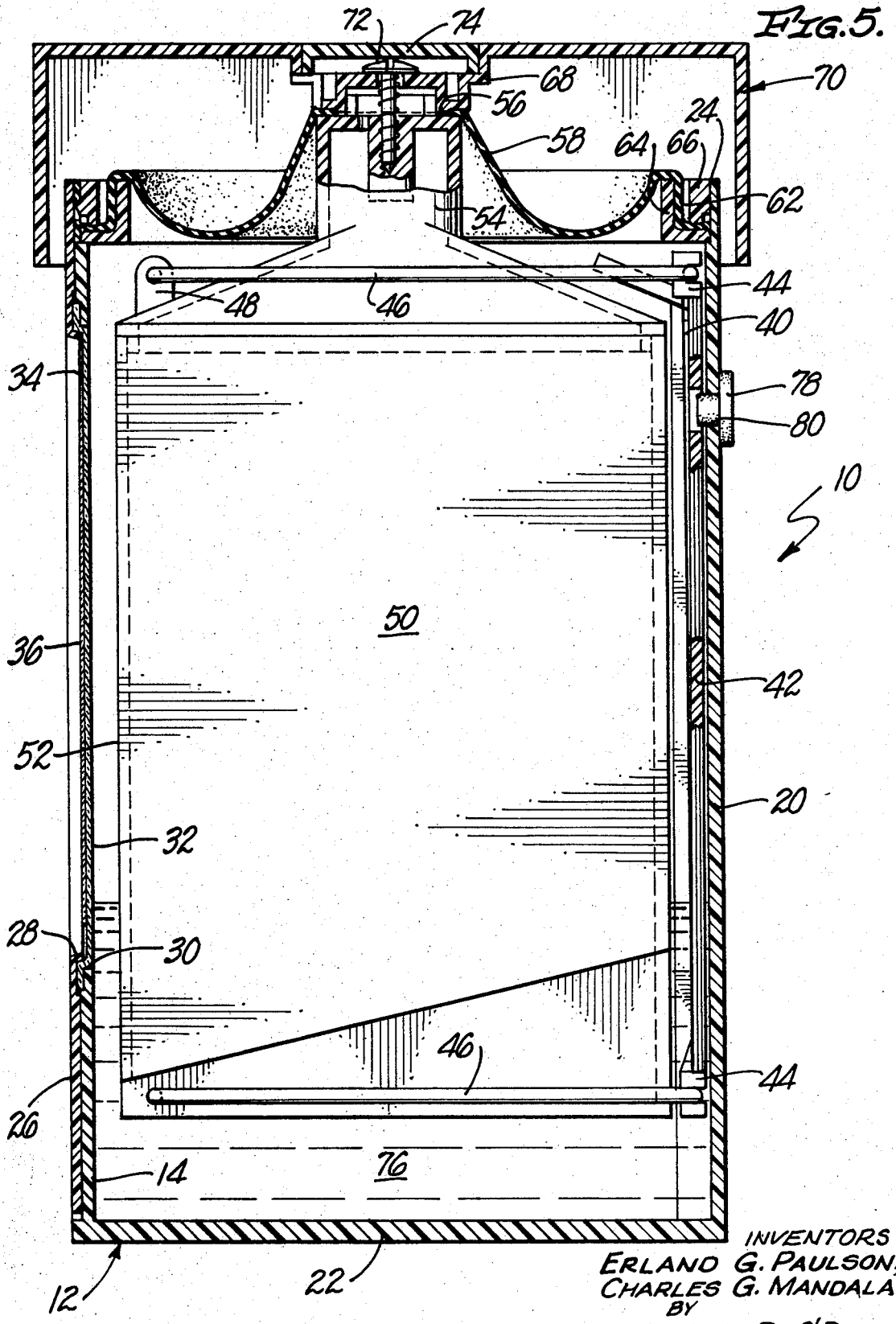

BUOYANCY TYPE WEIGHING SCALE

BACKGROUND OF THE INVENTION:

For many centuries it has been known that Archimedes' principal could be used for weighing various different items. In the use of Archimedes' principal for this purpose, an item to be weighed is placed upon a float or floating body located within a liquid. In weighing in this manner the amount that the float or floating body sinks in the liquid in response to the applied weight is an indication of the amount of the applied weight. A variety of different structures based upon this principal for normal or conventional office, home and small scale industrial applications are known. In general the weighing devices for such applications are comparatively small and portable. A problem has been encountered with comparatively small weighing devices utilizing Archimedes' principal. This is the problem of enclosing or sealing these devices so as to prevent liquid loss and/or liquid contamination. It is believed that this particular problem must be explained in some detail. If the liquid within a weighing device of the type indicated is not present in a predetermined amount, any means used to determine the depth to which a float sinks in response to an applied weight will not give a true and accurate indication of the amount of such weight.

A scale user cannot normally be trusted to place within a weighing device of the Archimedes' type a correct quantity of a liquid such as water or to check and make sure that such a fluid has not been lost through evaporation or has not become contaminated or has not been lost through spillage in moving the device. It has been proposed to control the liquid content in Archimedes' type weighing devices by sealing such devices with a diaphragm. It is considered that this is most conveniently accomplished through the use of a flexible diaphragm extending between the float in the weighing device and the housing.

Whenever such a diaphragm is used there are, however, certain problems. The mere presence of such a diaphragm to a degree will tend to effect the accuracy of any weight reading obtained in this type of weighing device. From a practical point of view this tendency is so small as to be capable of being neglected if the diaphragm is a lightweight, extremely limber, "floppy" type of member. As normally used such a diaphragm will enclose a quantity of gas within the housing between the diaphragm and the liquid present. Such a quantity of gas will change the weighing characteristics of a weighing device in accordance with ambient conditions.

More specifically, it has been found that at relatively high altitudes the gas within a weighing device as described will tend to expand, inflating the diaphragm. Similarly in relatively hot weather the gas within the weighing device will also tend to expand. Under extremely cold weather conditions this gas will tend to decrease in volume and become comparatively dense. All of such items will influence the accuracy of a comparatively small weighing device using Archimedes' principal constructed so as to employ a diaphragm as described to a sufficient extent so as to make the use of such a weighing device undesirable.

SUMMARY OF THE INVENTION:

An object of the present invention is to provide a new and improved weighing device using Archimedes' principal. More specifically an objective of the present invention is to provide weighing devices of the type indicated which overcome various disadvantages and limitations of prior related devices employing a diaphragm to hold and protect a liquid within a housing. Such disadvantages and limitations are as briefly indicated in the preceding discussion. Another somewhat related objective of the present invention is to provide weighing devices as the type described employing adjustable means for determining the depth of the float within such a device.

Further objectives of the present invention are to provide new and improved weighing devices as indicated which may be constructed without significant difficulty at a comparatively nominal cost, which may be easily handled and shipped, which are capable of giving a reasonably accurate indication of weight or amount of weight, and which are capable of being used satisfactorily for a prolonged period without requiring significant service or maintenance. The manner in which these various objectives are achieved in accordance with this invention will be apparent from a careful consideration of the remainder of this specification, the appended claims and the accompanying drawings.

In order to facilitate an understanding of the invention it can be indicated in essentially a summary form that the invention concerns the utilization of a means for controlling the pressure of a gas within a housing in a weighing device of an Archimedes' principal type having a float suspended in a liquid within a housing, and having a diaphragm connecting the float with the housing so as to enclose the liquid and a gas and having a means for determining the depth of the float within the liquid.

In accordance with this invention a weighing device as indicated and, indeed, any other weighing device of the Archimedes' principal type should be constructed so that such means for determining the depth of the float are adjustable so that the level of the liquid will always be a true indication of the weight of an item being weighed, regardless of the position of the weighing device. The invention encompasses many more details than can be completely indicated in a summary of this type.

BRIEF DESCRIPTION OF THE DRAWINGS:

Such details will be apparent from a careful consideration of the remainder of this specification and of the accompanying drawings in which:

FIG. 1 is a front elevational view of a presently preferred embodiment or form of a weighing device in accordance with the present invention;

FIG. 2 is a cross-sectional view taken at line 2—2 of FIG. 1;

FIG. 3 is a cross-sectional view taken at line 3—3 of FIG. 1;

FIG. 4 is a partial cross-sectional view taken at line 4—4 of FIG. 1;

FIG. 5 is a cross-sectional view taken at line 5—5 of FIG. 1; and

FIG. 6 is a top plan view of a part used in the weighing device shown in the preceding figures.

It will be realized that the weighing device shown in the accompanying drawings is not the invention itself, but is merely a specific, presently preferred structure embodying the invention or more precisely the principals or features of the invention. These principals or features of the invention can be embodied within other somewhat differently appearing and/or constructed weighing devices through the use or exercise of routine engineering design skill. These principals or features of the invention are as indicated in the appended claims forming a part of this specification.

DETAILED DESCRIPTION OF THE PREFERRED EMBODIMENT:

In the drawings there is shown a weighing device 10 in accordance with the present invention. This device 10 includes a generally rectilinear housing 12; this housing 12 has a recessed front 14, sides 16 and 18, a back 20, a bottom 22 and a top 24 which is open prior to the complete assembly of the device 10. This front 14 is recessed slightly so as to provide room so that a cover plate 26 may be located in a flush, clean-cut appearing manner between the sides 16 and 18.

This cover plate 26 has a centrally located opening 28 which is aligned with another similar opening 30 in the front 14. This opening 30 is sealed off by a transparent window 32 attached to the front 14. With this construction, flat spaces 34 are provided between the cover plate 26 and the front 14 so as to accommodate a transparent sheet of material 36 carrying markings or graduations indicating weight and preferably other information such as postal rates.

This sheet 36 may be referred to as a scale or graduated label. This sheet of material 36 is preferably formed of a transparent, somewhat resilient, somewhat flexible composition such as a film of a linear condensation polymer of polyethylene glycol and terephthalic acid. As formed it is preferred that the sheet 36 have slightly curled edges 38 as shown in FIG. 6 of the drawings. This sheet 36 is of such dimension that it can be inserted through the opening 28 across the window 32 so that the edges 38 extend into the spaces 34 so as to resiliently fit within these spaces 34 in such a manner as to frictionally support the sheet 36. It will be noted that the device 10 is constructed so that this sheet 36 can be moved vertically and so that it can be twisted slightly relative to the openings 28 and 30.

Within the interior of the housing 12, slots 40 are located adjacent to the back 20 so as to face one another. These slots 40 carry and hold a plate 42 so that this plate 42 rests upon the bottom 22. The plate 42 is provided with a series of four bearing structures 44, two of which are located adjacent to the top of the plate 42 and two of which are located adjacent to the bottom of this plate 42. These bearings 44 carry arms 46 fitting within other corresponding bearing structures 48 in a float 50. These bearing structures 44 and 48 involve simple pivot holes in the illustrated device 10.

With this construction the arms 46 constitute a parallelogram type of linkage enabling the float 50 to be moved up and down vertically in without significant friction impeding such movement. This float 50 has a flat, preferably white colored surface 52 located directly in back of the window 32. It will be noted that this surface 52 is spaced from the window 32 just far enough so that the float 50 will not "hang-up" by contact with the front 14 as the arms 46 pivot.

A centrally located top portion 54 of the float 50 extends upwardly from the top 24 of the housing 12 as shown. A centrally located opening 56 in a flexible, "floppy" rubber or similar thin, lightweight diaphragm 58 is located around a retaining—positioning flange 60 on the top portion 54. The periphery 62 of this diaphragm 58 is held between matting frames 64 and 66, secured in a fluid-tight manner to the front 14, the sides 18 and the back 20 of the housing 12 at the top 24 of this housing 12. This diaphragm 58 is clamped against the top portion 54 by means of a dependent boss 68 extending below a platform 70. This platform 70 is held in place by means of a screw 72 extending through the boss 68 and engaging the top portion 54. A small plug 74 is preferably located within the boss 68 so that the platform 70 will have a neat surface appearance.

Because of its imporous character the diaphragm 58 will trap or hold within the interior of the housing 12 a carefully premeasured quantity of a liquid 76 and of a gas—normally air—above this liquid 76. The liquid 76 is preferably and conveniently colored liquid which will not vaporize to any significant or noticeable extent within the device 10 at normal ambient temperatures and which will not freeze at normal ambient temperatures. Preferably this liquid 76 should have a sufficiently low viscosity—a normal ambient temperature—so that it will not impede any movement of the float 50 to any significant or noticeable extent. This liquid 76 should also be of a different color than the surface 52 of the float 50 so as to be clearly visible against this surface 52. Preferably the surface tension of the liquid 76 should be such that no significant meniscus is formed by it. Satisfactory results can be achieved with a dyed aqueous detergent solution.

The space above the liquid 76 within the housing 12 may be placed in communication with the exterior of the device 10 through the use of a small plug or cork 78 of rubber of a similar material. This plug 78 fits within a hole 80 in the back 20 adjacent to the top 24. This plug 78 is quite important with the complete weighing device 10. With this device 10 the pressure of the gas or air within the housing 12 may be equalized with the ambient air pressure by simply pulling out the plug 78 and then replacing it.

This simple operation or maneuver is sufficient to adjust the device 10 so that it will be sufficiently accurate for practical purposes even if the altitude of the device has been changed after its manufacture and even if the device is being used at relatively high or low ambient temperatures. In general the plug 78 should be pulled out and replaced each time the device 10 is moved so as to change its altitude or each time there is a significant change in the ambient temperature so as to assist the device 10 to perform accurately.

Because of the function of the plug 78 it may be referred to as a means or a vent means for use in controlling the pressure of the gas within the housing 12. Other equivalent means such as a conventional valve may be utilized in lieu of the plug 78. If the device 10 is designed with the intention that the interior of the housing 12 be pressurized, the pressure within the interior of the housing 12 may be held constant through the use of such a valve. For normal purposes, however, it is far simpler and just as effective to maintain the gas within the interior of the device 10 at ambient pressure through the use of the plug 78.

The sheet 36 is preferably moved or adjusted relative to the upper edge of the liquid 76 each time the plug 78 is used or each time the device 10 is moved from one location to another. By moving the sheet 36 in this manner it is possible to insure accurate weighing by locating the sheet 36 so that the level of the liquid 76 will give a true indication of the weight of an item on the platform 70 at the scale or indicia on the sheet 36. The movable character of the sheet 36 enables the scale 10 to be adjusted so as to give an accurate reading even if this device 10 is used on other than a perfectly flat horizontal surface.

Because of the function, the graduations on the sheet 36, the sheet 36 may be referred to as a means for determining the depth of the float 50 within the liquid 76 and the housing 12. The sheet 36 may be easily replaced with the structure shown by being snapped into and out of the spaces 34 by material deformation. The curved edges 38 will, of course, normally be flattened within these spaces 34 so that the sheet 36 will be held in any location to which it is moved by friction. With the construction employed the sheet 36 can conveniently be replaced with new sheets 36 indicating new postal rates as postal rates rapidly advance in an inflation riddled economy or indicating a different system of weight measurement.

From a detailed consideration of the preceding portions of this description and of the accompanying drawings it will be realized that the weighing device 10 is an easily constructed, simple, effective device capable of giving prolonged reliable service. This device 10 may be easily used by applying an item to be weighed as indicated upon the platform 70. This will, of course, cause the float 50 to sink, raising the level of the liquid 76. The sheet 36 as indicated is essentially a graduation means for use in determining or reading out this liquid level 76.

We claim:
1. A weighing device having a housing, a liquid located within said housing and partially filling said housing, a float suspended in said liquid within said housing, a portion of said float extending above said liquid, said float being capable of supporting an item to be weighed during the use of said weighing device, a flexible diaphragm connecting said portion of said float and said housing so as to enclose the interior of said housing, said diaphragm being separated from said liquid by a space within said housing containing a gas, and a means for determining the depth of said float within said liquid so as to indicate the weight applied to said weighing device, in which the improvement comprises:
    means for use in controlling the pressure of said gas within said space of said housing,
    said means for use in controlling is capable of being actuated so as to connect said space containing said gas within the interior of said housing with the exterior of said housing so that the pressure of said gas may be regulated in accordance with an external pressure,
    said means for use in controlling comprise a vent means leading from the interior of said housing to the exterior of said housing, said vent means being capable of being opened and closed.
2. A weighing device as claimed in claim 1 wherein:
    said vent means comprises a hole in said housing and a plug for closing said hole.
3. A weighing device as claimed in claim 1 wherein:
    said means for determining the depth is adjustable so as to compensate for any change in the relative position of said means for determining and said liquid caused by a change in ambient conditions.
4. A weighing device as claimed in claim 1 wherein:
    said means for use in controlling is capable of being actuated so as to connect said space containing said gas within the interior of said housing with the exterior of said housing so that the pressure of said gas may be regulated in accordance with an external pressure,
    said means for determining the depth is adjustable so as to compensate for any change in the relative position of said means for determining and said liquid caused by a change in ambient conditions.
5. A weighing device as claimed in claim 1 wherein:
    said means for use in controlling comprise a vent means leading from the interior of said housing to the exterior of said housing, said vent means being capable of being opened and closed,
    said means for determining the depth includes a transparent window in said housing, the level of said liquid relative to said float being visible through said window, and a transparent member containing graduations indicating weight located along the exterior of said window so as to be movable relative to the liquid level within said housing and means for holding said transparent member in a desired position relative to said liquid level.
6. A weighing device as claimed in claim 5 wherein:
    said vent means comprise a hole in said housing and a plug for closing said hole,
    said means for holding comprise friction means on said transparent member frictionally holding said transparent member relative to said window,
    said transparent member is a flexible, resilient transparent sheet having curved ends, and wherein
    said housing includes flat spaces alongsides of said window, said curved ends fitting within said spaces so as to be flattened by contact with the walls thereof so as to hold said sheet frictionally in position.
7. A weighing device as claimed in claim 1 wherein:
    said means for determining the depth includes a transparent window in said housing, the level of said liquid relative to said float being visible through said window, and a transparent member containing graduations indicating weight located along the exterior of said window so as to be movable relative to the liquid level within said housing and means for holding said transparent member in a desired position relative to said liquid level.
8. A weighing device as claimed in claim 7 wherein:
    said means for holding comprise friction means on said transparent member frictionally holding said transparent member relative to said window.
9. A weighing device as claimed in claim 8 wherein:
    said transparent member is a flexible, resilient transparent sheet having curved ends, and wherein said housing includes flat spaces alongsides of said window, said curved ends fitting within said spaces so as to be flattened by contact with the walls thereof so as to hold said sheets frictionally in position.

10. A weighing device having a housing, a liquid located within said housing and partially filling said housing, a float suspended in said liquid within said housing, a portion of said float extending above said liquid, said float being capable of supporting an item to be weighed during the use of said weighing device, a flexible diaphragm connecting said portion of said float and said housing so as to enclose the interior of said housing, said diaphragm being separated from said liquid by a space within said housing containing a gas, and a means for determining the depth of said float within said liquid so as to indicate the weight applied to said weighing device, in which the improvement comprises:

said means for determining the depth of said float comprising a transparent member located adjacent to said float, the surface of said liquid being visible through said member, and means for holding said member so that said member is capable of being moved from one fixed position to another, said member carrying graduations indicating weights of items being weighed corresponding to various positions of said liquid relative to said float and said member.

11. A weighing device as claimed in claim 10 wherein:

said means for holding comprise friction means on said transparent member frictionally holding said transparent member relative to said window.

12. A weighing device as claimed in claim 11 wherein:

said transparent member is a flexible, resilient transparent sheet having curved ends, and wherein said housing includes flat spaces alongsides of said window, said curved ends fitting within said spaces so as to be flattened by contact with the walls thereof so as to hold said sheet frictionally in position.

* * * * *